United States Patent [19]

Tsuchiya et al.

[11] Patent Number: 5,754,370
[45] Date of Patent: May 19, 1998

[54] WIRED SUSPENSION ASSEMBLY IN DISK STORAGE DEVICE METHOD FOR ASSEMBLY HEAD SUSPENSION ASSEMBLY

[75] Inventors: Tatsumi Tsuchiya, Ayase; Seiji Nakagawa, Fujisawa; Tatsushi Yoshida; Yasuhiro Mita, both of Chigasaki, all of Japan

[73] Assignee: International Business Machines Corporation, Armonk, N.Y.

[21] Appl. No.: 893,446

[22] Filed: Jul. 11, 1997

Related U.S. Application Data

[63] Continuation of Ser. No. 709,920, Sep. 9, 1996, abandoned.

[30] Foreign Application Priority Data

Oct. 12, 1995 [JP] Japan ............... 7-264413

[51] Int. Cl.$^6$ ............... G11B 5/48; G11B 3/10
[52] U.S. Cl. ............... 360/104
[58] Field of Search ............... 360/107, 104

[56] References Cited

U.S. PATENT DOCUMENTS

| | | | |
|---|---|---|---|
| 4,616,279 | 10/1986 | Poorman | 360/103 |
| 4,670,804 | 6/1987 | Kant et al. | 360/102 |
| 5,184,265 | 2/1993 | Foote et al. | 360/104 X |
| 5,296,984 | 3/1994 | Fick | 360/104 |
| 5,391,842 | 2/1995 | Bennin et al. | 174/260 |
| 5,491,597 | 2/1996 | Bennin et al. | 360/104 |

OTHER PUBLICATIONS

IBM TDB JA892-0114 vol. 36 No. 09A Sep. 1993 "Suspension With Curved Crimp" by Y. Fukase et al.
IBM TDB RO892-0115 vol. 38 No. 07 Jul. 1995 "Head Suspension Assembly Deflection Limiter" by M. Hernandez et al.

*Primary Examiner*—John H. Wolff
*Attorney, Agent, or Firm*—Noreen A. Krall

[57] ABSTRACT

The present invention provides a new tab structure for a head suspension assembly in a magnetic storage system. In the prior art method of assembly, a harness temporarily holds a wire assembly. The present invention eliminates the need for the harness, thereby reducing the number of parts and steps as well as improving productivity and quality. A flexure of a suspension assembly must be manufactured very precisely. The present invention provides a new tab structure either integral with or separate from the flexure. Wires bridge over to an extension on the tab structure at a predetermined distance from the end of the load beam. Positioning holes, using the extreme flatness of the tab structure, align the wires with the bonding pads of a head. The suspension assembly is subsequently bonded to the head, and the unwanted tab structure is removed to complete the head suspension assembly.

13 Claims, 8 Drawing Sheets

WIRED SUSPENSION ASSEMBLY IN DISK STORAGE DEVICE METHOD FOR ASSEMBLY HEAD SUSPENSION ASSEMBLY

This a continuation of application Ser. No. 08/709,920, filed on Sep. 9, 1996, entitled "Wired Suspension Assembly In Disk Storage Device And Method For Assembling Head Suspension Assembly", in the name of Tatsumi Tsuchiya, Seiji Nakagawa, Tatsushi Yoshida and Yasuhiro Mita.

BACKGROUND OF THE INVENTION

1. Field of the Invention

The invention relates to a head suspension assembly in a magnetic storage system, and in particular, to a method and apparatus for attaching wires in a head suspension assembly.

2. Description of the Background Art

Magnetic disk drives are information storage devices which utilize at least one rotatable magnetic media disk, mounted on a rotating spindle, having concentric data tracks defined for storing data, a read/write transducer, or head, for reading data from and/or writing data to the various data tracks, a slider for supporting the head adjacent the data tracks typically in a flying mode above the storage media, a suspension assembly for resiliently supporting the slider and the head over the data tracks, and a positioning actuator coupled to the head/slider/suspension combination for moving the head across the media to the desired data track and maintaining the head over the data track center line during a read or write operation.

The head is attached to or formed integrally with the slider which supports the head above the data surface of the storage disk by a cushion of air, referred to as an air bearing, generated by the rotating disk.

Alternatively, the head may operate in contact with the surface of the disk. The suspension provides slider loading and dimensional stability between the slider and the actuator arm which couples the head/slider/suspension assembly to the actuator. The suspension is required to maintain the head and the slider adjacent the data surface of the disk. The actuator positions the head over correct track according to the data desired on a read operation or to the correct track for the placement of data during a write operation. The actuator is controlled to position the head over the desired data track by shifting the combination assembly across the surface of the disk in a direction generally transverse to the data tracks.

The trend in magnetic storage systems is for smaller and more precise disk drives, and various methods are used to build the disk drives. The trend towards increasing the capacity of memory storage devices has not bypassed disk drives. One attempt to increase storage capacity includes reducing the height of the magnetic transducer above the disk surface, thus permitting disks to be stacked more closely together. It is therefore a challenge to develop smaller head suspension assemblies so as to meet the requirements of increased capacity disk drive systems of smaller physical size. Disk drives require not only a mechanical assembly to physically position the head with respect to the disk, but also require wires to transmit signals to and from the head for reading and writing information on the disk surface. Smaller disk drives need finer wires. However, the finer wires have a large impact on productivity. The wires must be precisely positioned for attachment to the head. In some manual assembly lines, wires are positioned and repositioned with tweezers. Therefore, productivity has been low. The head and wires are often damaged, resulting in an undesirable product in terms of quality assurance.

Other assembly lines use a wire harness to provide connection between the head transducer and the head electronics. The wire harness is typically made of two to four precut wires with stripped ends inserted in a tube. The wires on both ends are in some cases pre-spaced (held in a removable plastic frame) to match the head pads on one end and the termination head electronics pads on the other end. Although the wire harness helps in stringing the wires in a head suspension assembly, it is a costly component used in the assembly process.

Referring to FIG. 1, a typical magnetic storage system or hard disk drive (HDD) is shown. A magnetic storage system 10 has a disk assembly 11 and a hard disk controller (HDC) 30 with a local central processing unit (CPU). The disk assembly 11 has a spindle motor 14 which rotates a shaft 12 at a high speed. The shaft 12 is axially aligned with and is attached to a cylindrical supporting body 16. The supporting body 16 has one or more magnetic disks 1 BA, 18B mounted on its outer circumferential surface at a predetermined spacing. When the spindle motor 14 rotates the shaft 12, the disks 18A, 18B rotate integrally with the supporting body 16.

Each head 20A to 20D faces a disk surface. The actuator arms 22A to 22D support and position the heads 20A to 20D respectively. Each head 20A to 20D has a slider and a magnetic transducer. The actuator arms 22A to 22D are attached to an actuator 28 via a shaft 26. The shaft 28 rotates to move the heads 20A to 20D to a predetermined position with respect to the disks. The spindle motor 14 and the actuator 28 connect to the HDC 30 which controls the number of rotations and speed. The HDC 30 may connect to a host 32.

Referring now also to FIG. 2, a head suspension assembly (HSA) 30 is shown. The head suspension assembly 30 is also known as a head gimbal assembly because it allows the head to gimbal with respect to the disk surface. In the disk assembly 11 of the magnetic storage system 10, each actuator arm 22A to 22D includes a head suspension assembly 40. The HSA 30 comprises the suspension assembly 40, a head 20A to 20D (FIG. 1), and one or more wires 52 strung thereon to transmit signals to and from each head 20. The wires 52 of the wire assembly 50 are bundled in a tube 54. Alternatively, the wires 52 may coated with an insulator, such as polyurethane, and bundled in another manner or the wires 52 may even remain loose. The suspension assembly 40 has a crimping section 45 for affixing the tube 54. However, other methods of attaching the wire assembly 50 to the suspension assembly 40 are well-known to those skilled in the art.

FIG. 3 shows the suspension assembly 40. The suspension assembly 40 comprises a flexure 42, a load beam 44, and a mount plate 46 (sometimes called a base plate). The flexure 42 and the load beam 44 are spot welded, for example at position 43, to form a cantilever using the position 43 as a supporting point. In addition, the load beam 44 is typically spot welded to the mount plate 46 at a number of locations. The mount plate 46 has a mounting hole 48 for attachment to an actuator arm 22A to 22D (FIG. 1 ) or directly to the shaft 26.

When the disks 18A, 18B rotate, each head 20A to 20D flies over each disk surface respectively. The load beam 44 has elasticity and can flex. The primary function of the load beam 44 is to oppose the lift of the head 20A to 20D while the head is flying to balance the head near the disk surface.

The flexure 42 is much smaller and thinner than the load beam 44. The primary function of the flexure 42 is to adjust the flying height of the head to the fine recesses and undulations of the disk surface using its sensitive elasticity. In particular, the flexure 42 must be made with high precision because the head must fly closer to the disk surface to accommodate higher data recording densities. As shown in FIG. 3, the suspension assembly 40 comprises the flexure 42, the load beam 44, and the mount plate 46.

Referring now to FIG. 4, a top view of a prior art harness assembly 60 of a head suspension assembly is shown. The harness assembly 60 has a harness 62 and a wire assembly 50. In the harness assembly 60, a plurality of wires 52 extend out of the tube 54, over an opening 64 to an extension 65 of the harness 62. The wires 52 are attached at a predetermined distance from each other and also at a predetermined distance from the end of the flexure 42. The wires 52 are bonded or otherwise affixed to the extension 65 of the harness 62. The opening 64 allows the head 20 to be conveniently bonded. The wires 52 can be externally accessed through the opening 64 for bonding. In addition, the harness 62 has a notched retainer 63 to temporarily hold the wire assembly 50.

Referring also to FIG. 5, a perspective view of the prior art orientation of the wires 52 of the harness assembly 60 with respect to the bonding pads 70 of a head 20 is shown. The notched retainer 63 holds tube 54. In the harness assembly 60, a test end 68 is formed within the frame configuration of the harness 62. Subsequently, if most of the harness 62 is no longer wanted, the test end 68 can be retained and used to test the transmission of signals to and from the head 20. However, the test end 68 is not wanted in the final product.

The harness 62, which is used as a frame base, is generally composed of a synthetic resin material, such as polyethylene terephthalate (PET). PET is not too rigid and flexes. Therefore, it is difficult to precisely manufacture the harness 62. Because the harness 62 must be compatible with the length of the wires, the harness 62 flexes more with longer wires. Since the harness 62 is manufactured by punching the shape from a film, shear deformation from the punching further reduces the precision of the final product.

Assembling the HSA 30 to the harness assembly 60 is done after the head 20 is attached to the flexure 42 at the end of the suspension assembly 40. The head 20 is typically bonded to the flexure 42 and has, for example, four bonding pads 70. The opening 64 of the harness assembly 60 is aligned with the bonding pads 70, and the wires 52 are electrically connected to the bonding pads 70. For example, the wires 52 may be connected by bonding methods such as thermal welding or cold bonding using ultrasonic vibration.

The precision of the assembly operation will now be discussed. First, positioning holes 66 and 67 (shown in FIG. 4) are used to align the opening 64 of the harness assembly 60 with the bonding pads 70. For example, FIG. 5 shows a method of alignment which inserts conical or truncated conical jigs 66a into the positioning holes 66. Other methods are well-known to those skilled in the art. However, because of the nature of the harness material and the precision in manufacturing the harness 62, simply using the positioning holes 66, 67 does not result in accurate alignment.

After the wires 52 are electrically connected to the bonding pads 70, generally the harness 62 is no longer needed. For example, since the wire assembly 50 is not permanently attached to the harness assembly 60, the wire assembly 50 is easily detached from the harness assembly 60 by opening the notched retainer 63 with a pair of (projected) pins or tweezers. After detaching the wire assembly 50 from the harness assembly 60, the wires 52 and the tube 54 are attached to the suspension assembly 40.

Referring to FIG. 6, a side view showing the rotation needed to install a prior art wire assembly 50 to the head suspension assembly 40 is shown. The long wire assembly 50 must be rotated for installation because the wires 52 are connected to the bonding pads 70. The connection limits the degree of freedom to position the wire assembly 50. In addition, it is difficult to adjust the size and shape of the wire loop 56 when all the long wires 52 are rotated. Basically, the longer the wires 52 the more likely the harness 62 will be deformed. In addition, excessive force in crimping the wire assembly 50 to the crimping section 45 may cause misalignment. Depending on the amount of misalignment, the bonds may break. Moreover, a smaller wire loop 56 requires even more careful operations. Therefore, an improvement is needed to the method of using a harness to assemble the HSA.

For smaller and more precise disk drives, the suspension assembly must be manufactured very precisely. It is therefore more efficient to use the inherent precision of each high precision part. Therefore, an improvement is needed not only to the assembly process but also to eliminate the need for the harness assembly 60.

SUMMARY OF THE INVENTION

To overcome the limitations in the prior art as described above, and to overcome other limitations that will become apparent upon reading and understanding the present specification, the present invention discloses a method and apparatus for mounting wires to a head suspension assembly.

The present invention solves the above-described problems by providing a new configuration for a suspension assembly using a detachable tab structure. The suspension assembly has the tab structure and a pre-installed wire assembly.

In a first preferred embodiment, the suspension is provided with a detachable tab structure. The tab structure is etched along with the suspension.

In a second embodiment, a tab structure is separate from the suspension and is attached to and detached from the suspension.

In a third embodiment, a tab structure is molded integrally with the suspension.

The present invention also provides a method for assembling a head suspension assembly. A wire assembly is attached to a suspension which is attached to a tab structure. The wires are fixed to the tab structure, a head is positioned between the suspension and the tab structure, and the wires are connected to the head. The tab structure is detached by vibrating to cause a fatigue failure, cutting, or using the elasticity of a separate tab structure.

These and various other advantages and features of novelty which characterize the invention are pointed out with particularity in the claims annexed hereto and form a part hereof. However, for a better understanding of the invention, its advantages and the objectives obtained by its use, reference should be made to the drawings which form a further part hereof, and to the accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 8b is an enlarged view of the notch at the boundary of the tab structure of FIG. 8a;

DESCRIPTION OF THE PREFERRED EMBODIMENT

Figure 4:
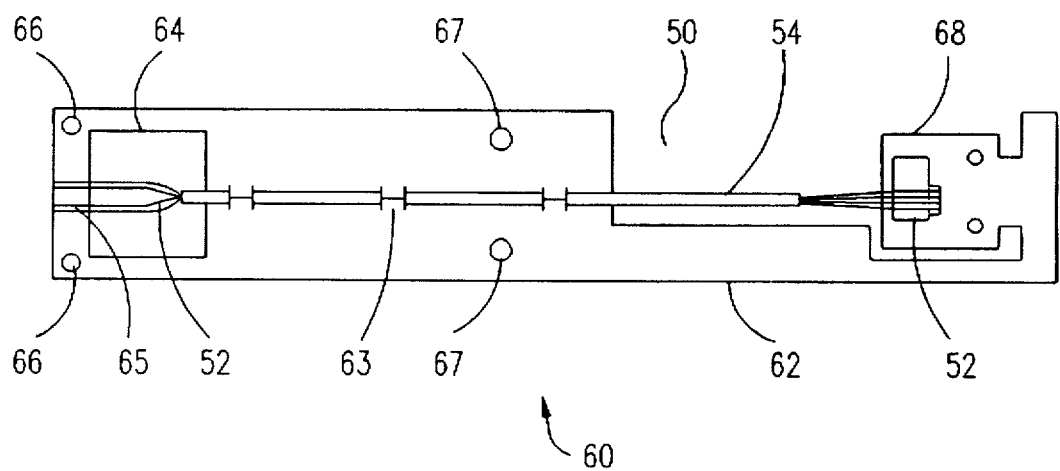
FIG. 4 is a top view of a prior art harness assembly used to assemble a head suspension assembly.
Figure 7:
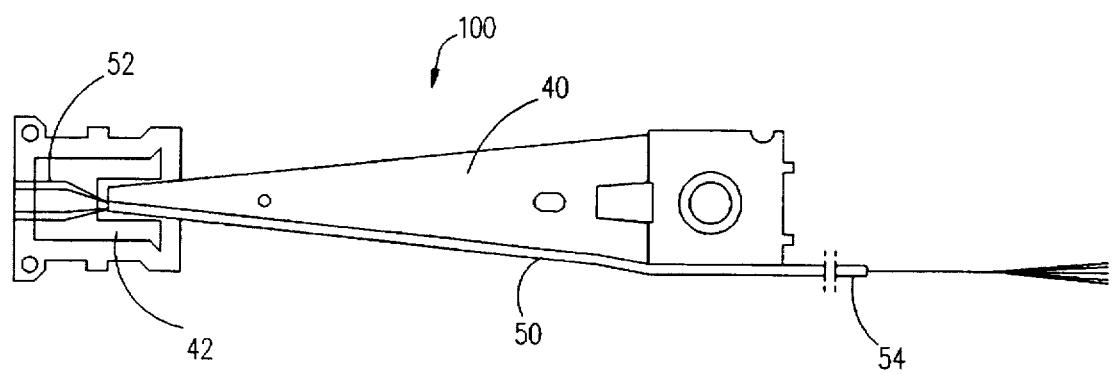
FIG. 7 is a plan view of a wired suspension assembly according to the present invention.

Referring to FIG. 7, a plan view of a wired suspension assembly 100 of the present invention is shown. The wired suspension assembly 100 is a suspension assembly with wires 52 pre-installed. In accordance with the preferred embodiment of the present invention, the suspension assembly 40 has a tab structure 110 extending from a flexure 42. The tab structure 110 eliminates the need for the harness 62 (previously shown and described in connection with FIG. 4) which is used to assemble the HSA 30 according to the prior art method. In addition, in the present invention, the suspension assembly 40 is attached to the wire assembly 50 before the head 20 is attached to the suspension assembly 40. Therefore, the present invention provides a simplified method of assembling the HSA which is an improvement over the methods known in the prior art.

Figure 8B:
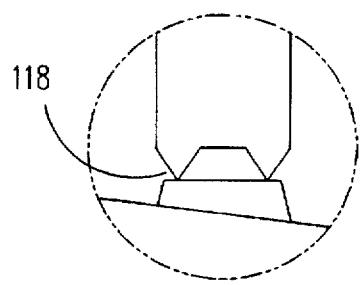
Figure 8A:
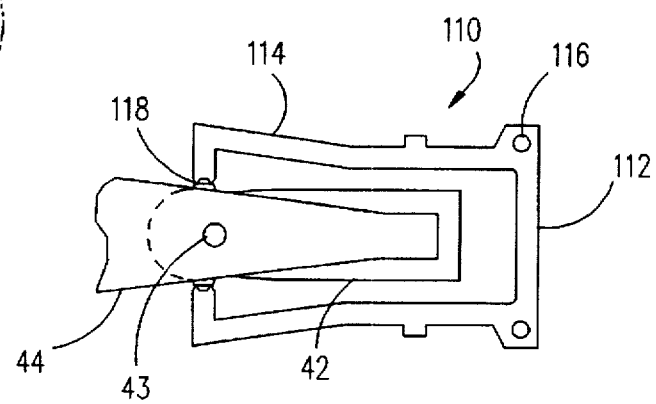
FIG. 8a is a plan view of a tab structure according to a preferred first embodiment of the present invention.

Referring to FIG. 8a, a plan view of the tab structure 110 according to the preferred first embodiment of the present invention is shown. The load beam 44, the flexure 42, and tab structure 110 are integrally formed using a chemical method, such as etching a thin metal plate (for example SUS304), to obtain high precision. As previously described, the flexure 42 must be made very precisely and inherently has high precision. Therefore, according to the present invention, the tab structure 110 and flexure 42 are formed economically and precisely by etching the flexure 42 and the tab structure 110 together. The tab structure 110 has an extension 112, and the wires are attached to the extension 112. According to the present invention, the load beam 44 may be prewired before its introduction into the HSA to reduce assembly cost. Therefore, the tab structure 110 eliminates the need for the separate harness 62 (FIG. 4) because the extension 112 replaces the extension 65 (FIG. 4) of the prior art harness 62. The wires are secured to the extension 112 using liquid or tape adhesives for example. Alternatively the extension 112 may be etched or notched to hold the wires in place.

Figure 9:
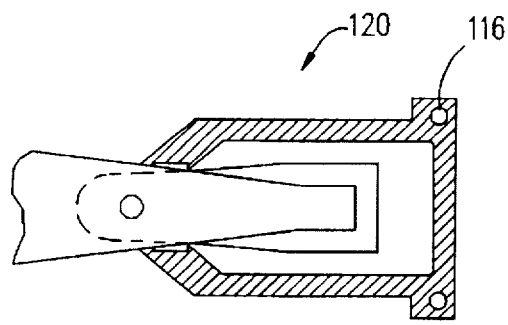
FIG. 9 is a plan view of a tab structure according to a second embodiment of the present invention.

Referring now to FIG. 9, a plan view of a tab structure 120 according to a second embodiment of the present invention is shown. The tab structure 120 is made separately from the flexure 42, and is subsequently attached to and detached from the flexure 42 which has been made very precisely. For example, the tab structure 120 is injection-molded plastic or machined metal.

Figure 10A:
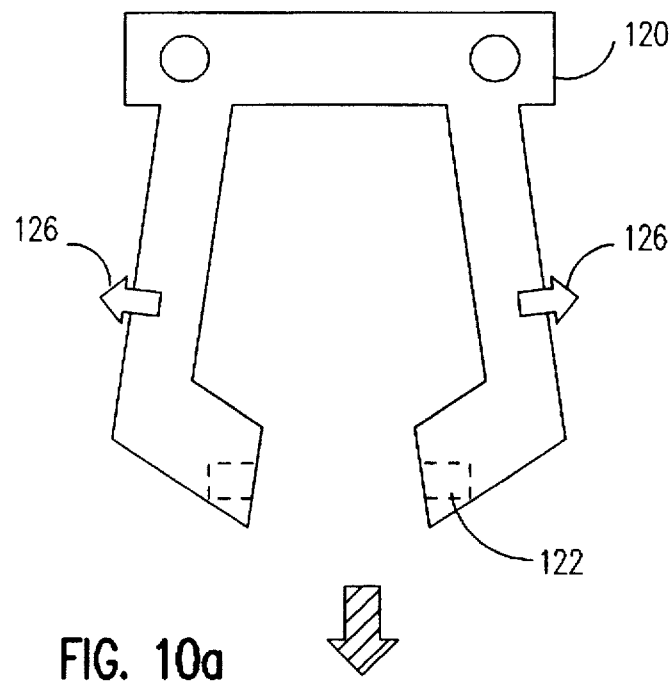
FIGS. 10a and 10b show the method of attaching the tab structure of the second embodiment of the present invention to the flexure.
Figure 10B:
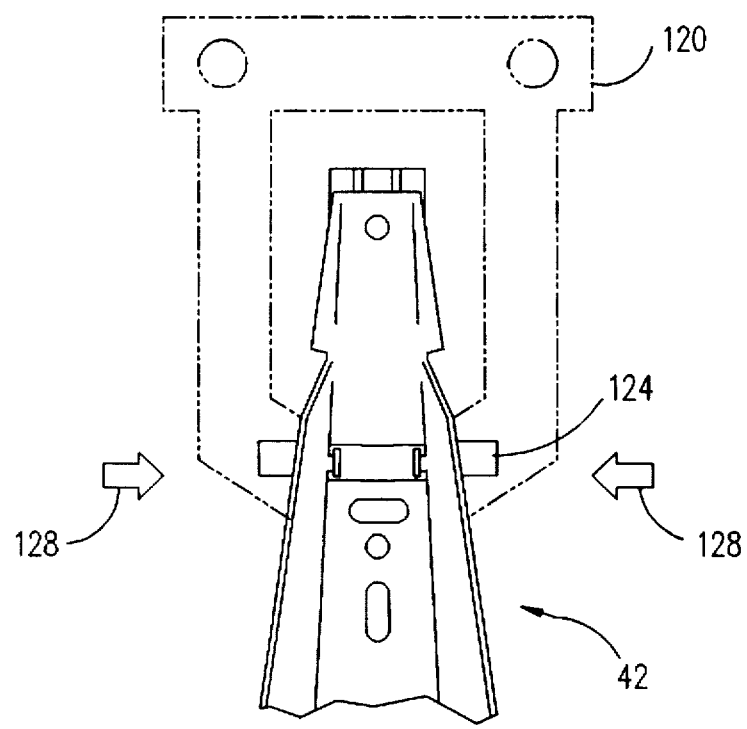

Referring also to FIGS. 10a and 10b, the method of attaching of the tab structure 120 of the second embodiment of the present invention to the flexure 42 is shown. The tab structure 120 has a female portion 122 independent of the flexure 42. The flexure 42 has a male portion 124. In FIG. 10a, to attach the flexure 42 to the tab structure 120, the elasticity of the tab structure 120 is used to open both ends of the female portion 122 in the direction of arrows 126. In FIG. 10b, the recovery force 128 is then used to install the flexure 42 to the tab structure 120 such that the female portion 122 fits the male portion 124. The second embodiment avoids the machining of the tab structure 120 during subsequent manufacturing steps, such as a cutting or a breaking step.

Figure 11:
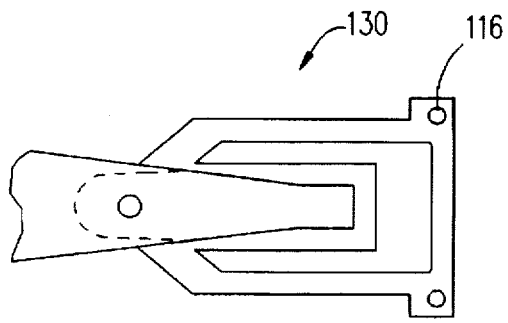
FIG. 11 is a plan view a tab structure according to a third embodiment of the present invention.

Referring now to FIG. 11, a plan view of a third embodiment of the tab structure 130 according to the present invention is shown. In the third embodiment, the flexure 42 and tab structure 130 are precisely manufactured as integral parts by casting or injection-molding. The tab structure 130 can also be molded in the flexure 42. The tab structure 130 of the third embodiment is similar to the tab structure 110 of the first embodiment.

Figure 5:
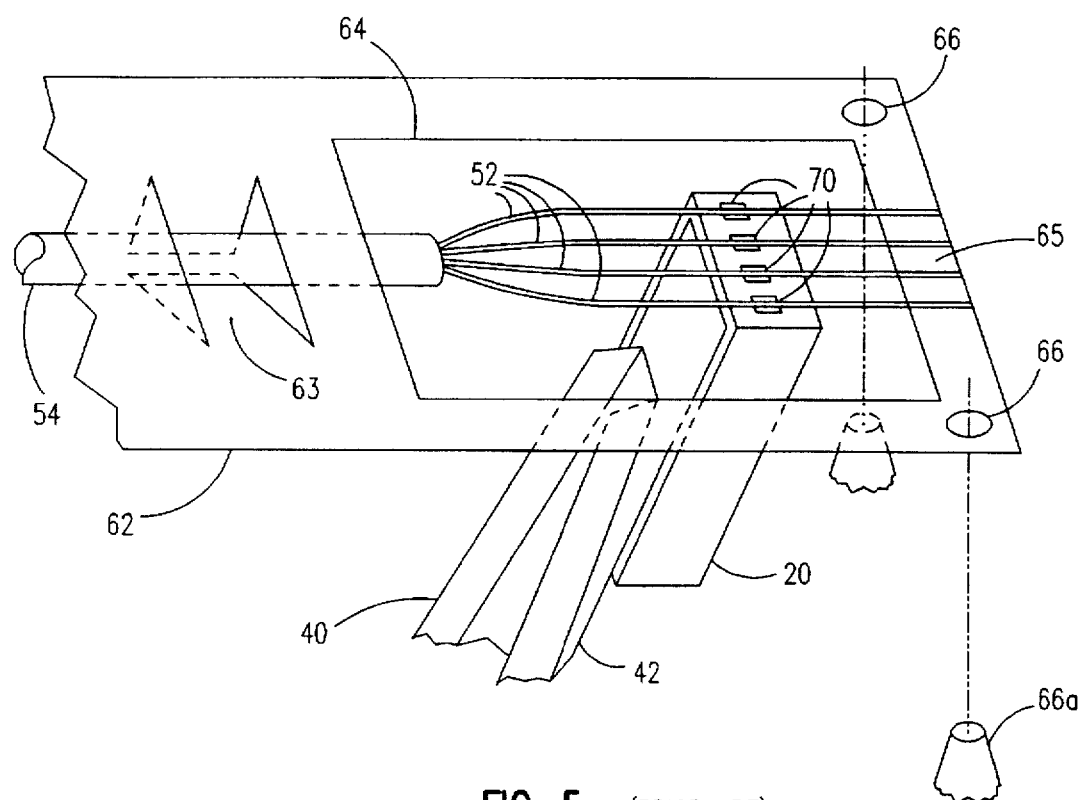
FIG. 5 is a perspective view of the orientation of a prior art harness assembly with respect to the bonding pads of a head when bonding.

When precisely manufactured as described, the tab structures 110, 120, 130 are flatter than the harness 62 (FIGS. 4, 5) used in prior art assemblies. The wires 52 must be aligned very precisely with respect to the head 20 for bonding. Each tab structure 110, 120,130 has holes 116 formed at the corners. Because the tab structure 110,120, 130 is extremely flat, the holes 116 are used for very precise alignment. Although two holes 116 are shown in the embodiments of the present invention, the invention is not meant to be limited to two holes, and other embodiments may have more or fewer holes. Referring also to FIG. 5, to position the tab structure 110,120,130, a conical or truncated conical pin 66a passes through the holes 66,116 until stopped by the diameter of the holes 66, 116.

As shown in FIG. 11, to maintain the extreme flatness, the tab structure 110 has irregularly pointed corners 114. The corners 114 improve the flatness by preventing torsion of the tab structure surface for example. Other methods of improving flatness are well-known to those skilled in the art.

Figure 6:
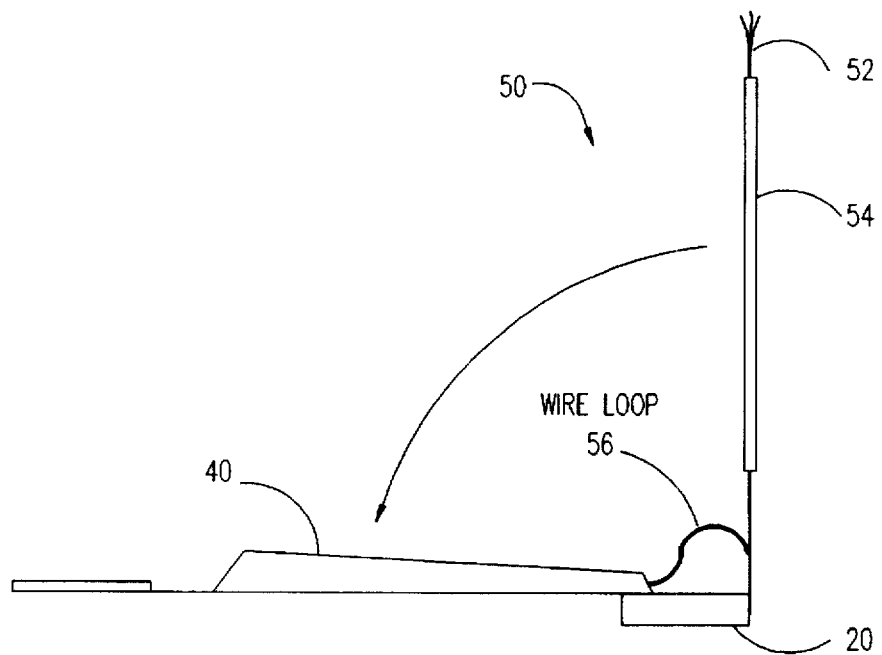
FIG. 6 is a side view showing the rotation of the wire assembly when attaching the head suspension assembly in the prior art.
Figure 12:
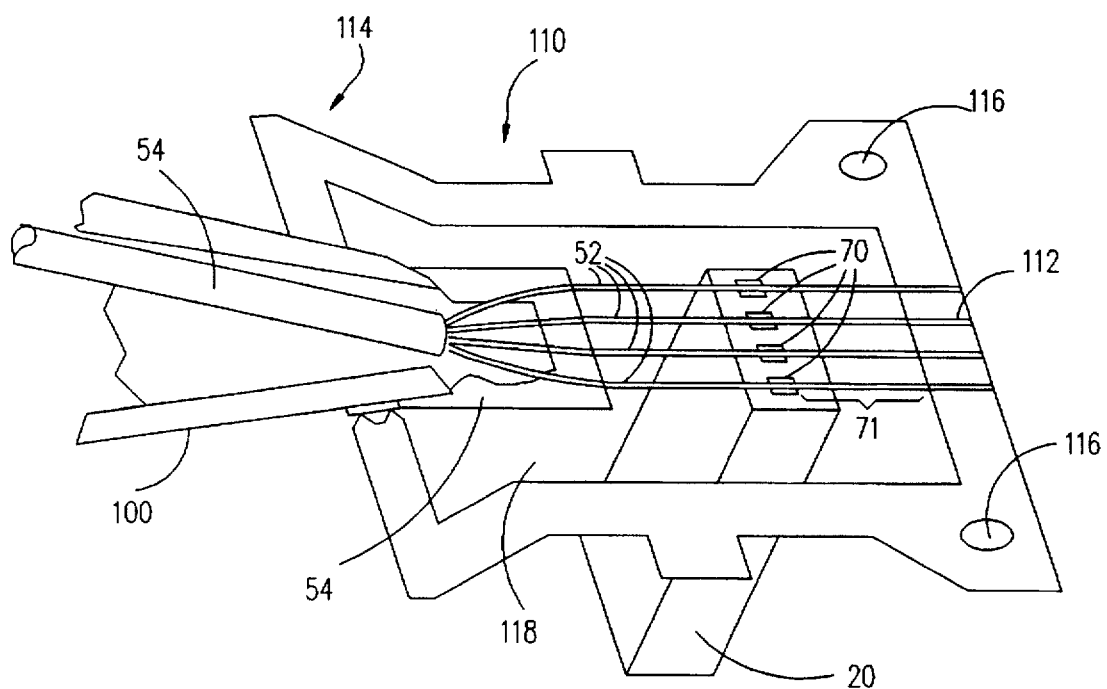
FIG. 12 is a perspective view of the orientation of the wires with respect to the bonding pads of a head using the tab structure of FIG. 8a according to the present invention.
Figure 13:
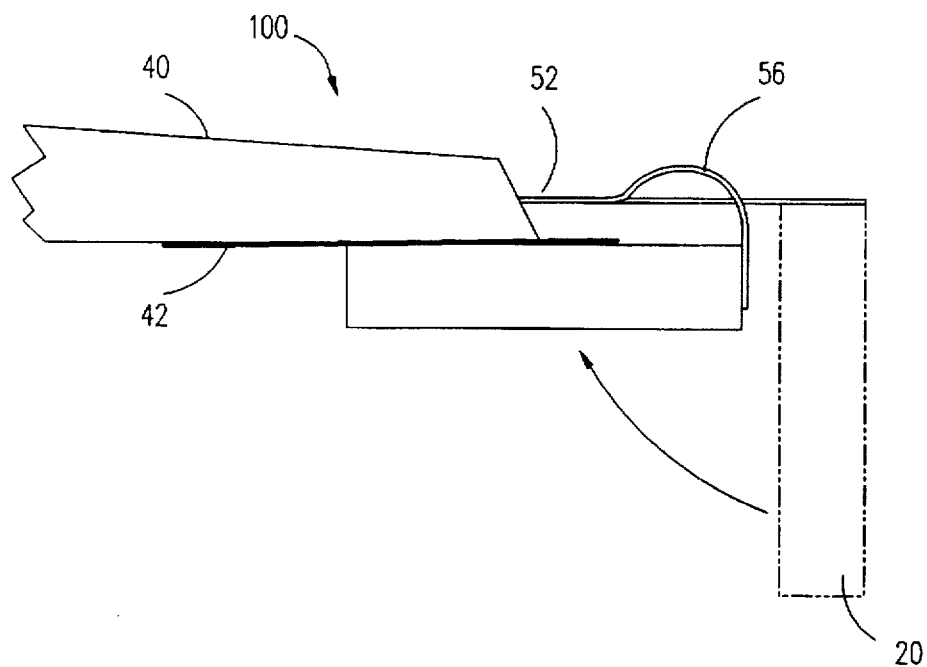
FIG. 13 is a side view showing the rotation of the head during the method of assembling a head suspension assembly according to the present invention.

Referring now to FIGS. 12 and 13, the method of assembly according to the preferred embodiment of the present invention will be described. The assembly method of the present invention is better understood when compared to the prior art method as shown in FIGS. 5 and 6. In FIG. 12, a perspective view of the orientation of the wires 52 with respect to the bonding pads 70 of a head 20 using the tab structure 110 of the first embodiment of the present invention is shown. The bonding pads 70 of the head 20 are positioned adjacent the wires 52 bridging over to the extension 112 of the tab structure 110. The position of the wired suspension assembly 100 with respect to the head 20 is also shown. The two positioning holes 116 provided in the tab structure 110 are used as shown in FIG. 5. In contrast to the prior art methods, the extreme flatness of the tab structure 110 makes use of the positioning holes 116 very effective because the wires 52 can be positioned very precisely with respect to the bonding pads 70 of the head 20. After positioning, the wires 52 are attached to the bonding pads 70 using ultrasonic bonding for example. As previously described, the head 20 has not yet been bonded to the wired suspension assembly 100.

Referring also to FIG. 13, a side view showing the rotation of the head 20 during the assembly process of the head suspension assembly is shown. To attach the head 20 to the suspension assembly 40 (typically through bonding), the wires 52 must be rotated. The wires 52 cannot be rotated until the wires 52 are cut in the bridging section 71 between the bonding pads 70 and the extension 112. Preferably, the wires 52 are cut as close as possible to the bonding pads 70. Preferably, the ultrasonic bonding process can be modified to cut the wires 52 without special cutting operations. Alternatively, the wires 52 are automatically pulled and cut when the head 20 is rotated.

Figure 1:
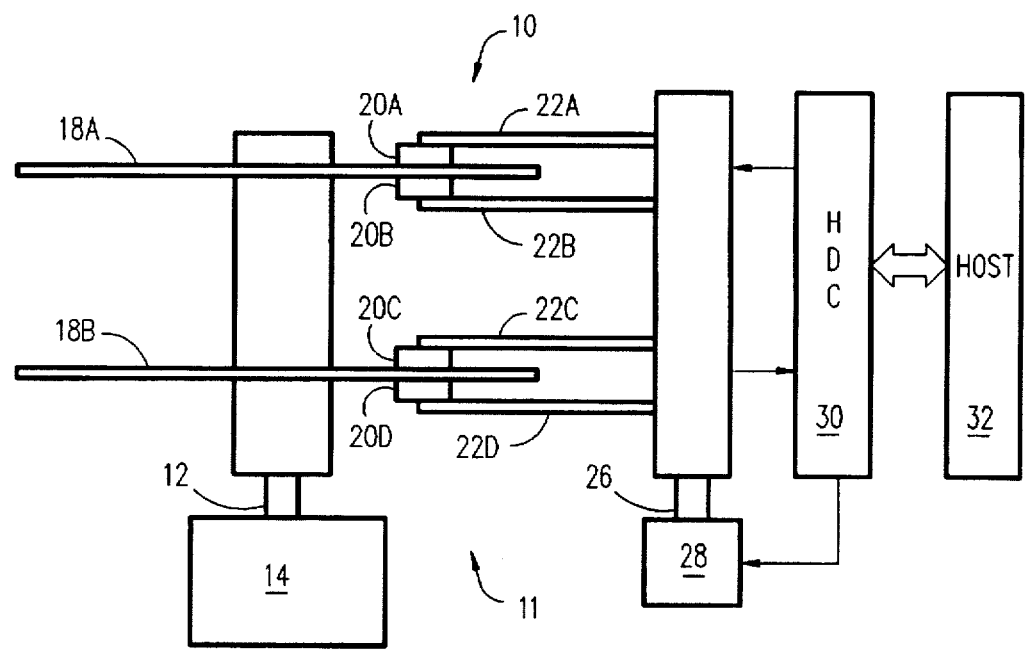
FIG. 1 is a block diagram of a magnetic storage system suitable for practicing the present invention.
Figure 2:
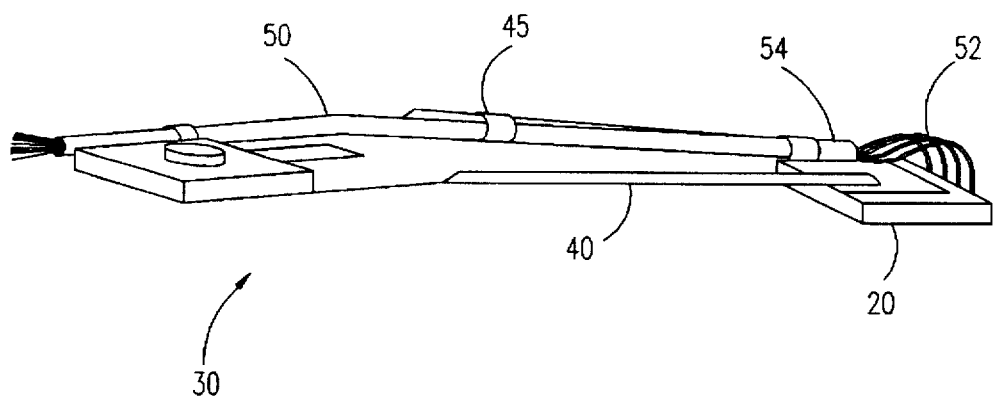
FIG. 2 is a perspective view of a head suspension assembly.
Figure 3:
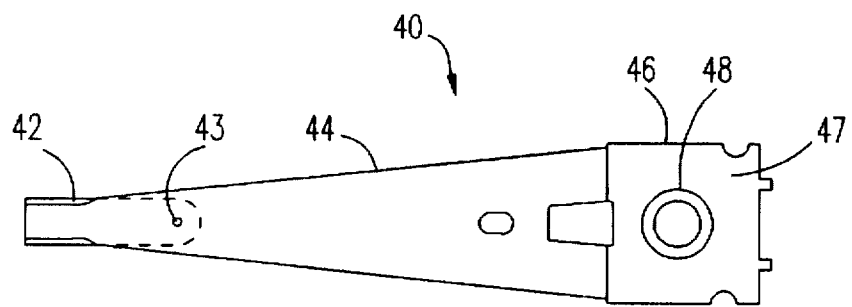
FIG. 3 is a plan view of a head suspension assembly.

The rotation of the head of FIG. 13 is similar to the rotation of the wire assembly in FIG. 6 because the center of rotation is near the bonded portions of the bonding pads 70. The rotations differ because the long wire assembly 50 in FIG. 6 rotates around a large radius, while the head 20 in FIG. 13 rotates around a small radius. This difference occurs because of the difference in the length of the wires 52. The wires 52 between the wired suspension assembly 100 and the bonded portion of the head 20 are relatively short. The short wires 52 limit the degree of freedom to cause unwanted movement. Since both the wired suspension assembly 100 and the head 20 are made of a more rigid material than the harness 62, the positioning is firm and stable. Therefore the present invention enables the size and shape of the wire loop 56 to be adjusted more easily than the prior art method of FIG. 6. Small disk drives have a small space between the disks 18A, 18B (FIG. 1). However, the present invention can advantageously limit, for example, the height of the wire loop 56.

Figure 14:
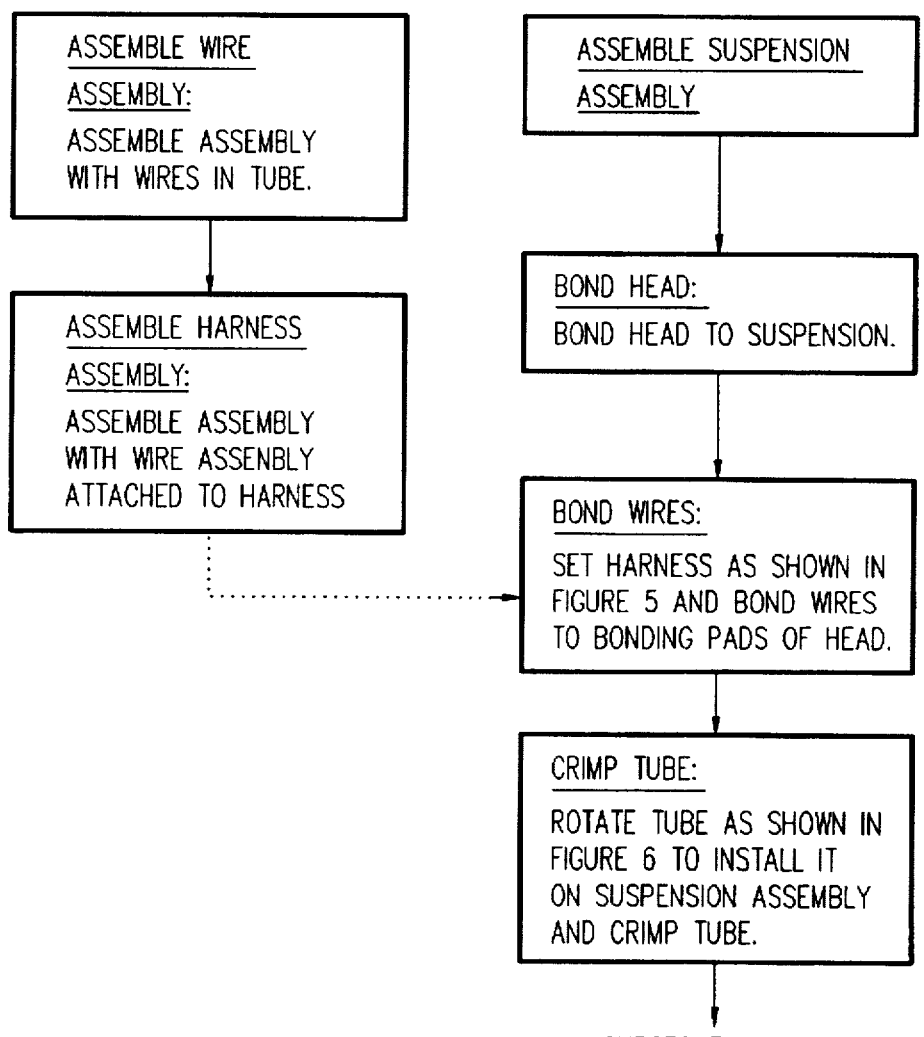
FIG. 14 is a flowchart of a prior art method of assembling a head suspension assembly using a harness.
Figure 15:
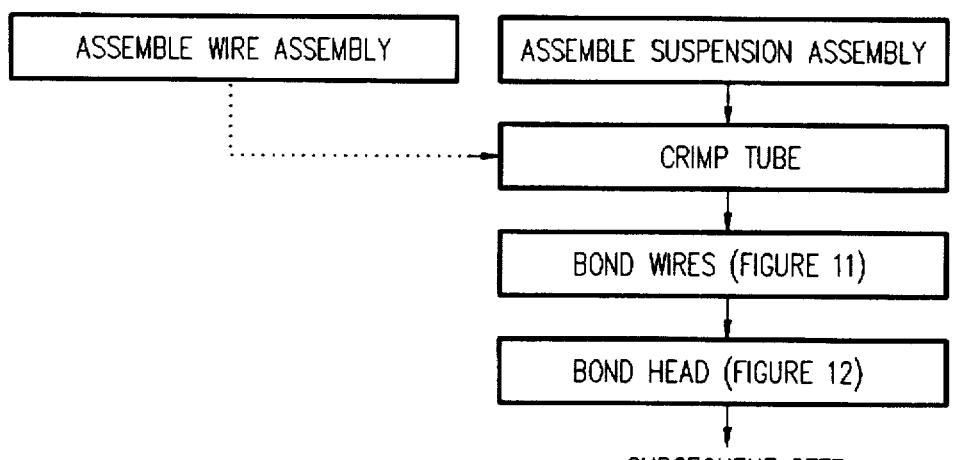
FIG. 15 is a flowchart of the method of assembling a head suspension assembly method according to the present invention.

FIG. 14 is a flowchart of a prior art method of assembly using the harness. FIG. 15 is a flowchart of a method of assembly of the present invention using the wired suspension assembly to eliminate the need for the harness. In comparing FIG. 14 to FIG. 15, it can be seen that the present invention teaches a simplified approach having fewer steps because the present invention eliminates the step of assembling the harness assembly of the prior art.

Since the tab structure of the present invention is an alternative to the harness of the prior art, those skilled in the art will recognize that the tab structure 110, 120, 130 is not wanted after the wired suspension assembly 100 is connected to the head 20. The tab structure 110, 120, 130 must be removed to complete the head suspension assembly.

Figure 16:
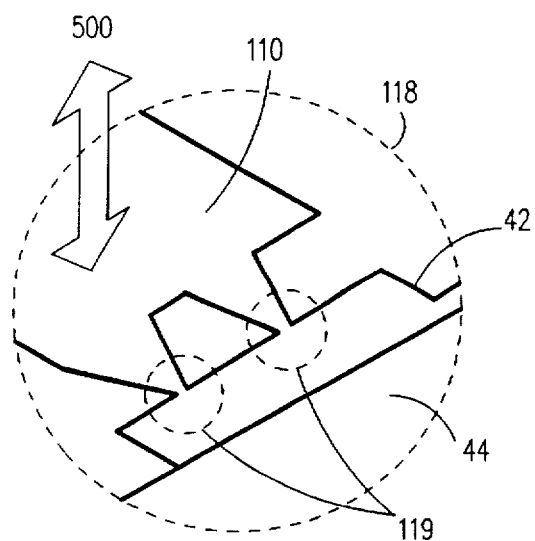
FIG. 16 is a detailed view of the boundary between the tab structure and the flexure of FIG. 8b according to the present invention.

Referring back to FIG. 8b, an enlarged view of a notch 118 is shown. The tab structure 110 of the first embodiment has a notch 118 with a V- or U-shaped constricted portion between the tab structure 110 and the flexure 42. Referring also to FIG. 16, the notch 118 and boundary 119 are shown in detail. The boundary 119 has substantially equal connection points, and therefore is easily broken. Preferably, the boundary 119 is broken by subjecting the boundary 119 to a small number of vibrations to cause a fatigue fracture. Those skilled in the art may know of other notch 118 configurations. In addition, those skilled in the art can determine whether the boundary 119 has been broken by machining, cutting, or fatigue fracture using metallographical observation of the micro-conditions of the broken surface. In other words, those skilled in the art could assume that the wired suspension assembly was used to assemble a head suspension assembly. This method also applies to the third embodiment.

In FIG. 16, alternating vibrations, depicted by arrow 500, are applied to cut the boundary 119 by a fatigue fracture. Preferably, a uniform force is applied to both the top and the bottom surfaces of the plane of the tab structure, and results in a vertically symmetric cut surface as compared to cutting methods using a force in a single vertical direction, that is, either downward or upward. The size of the constricted portion must be carefully determined to enable the boundary to be cut easily with a few bends. Preferably, for sheet metal 30 microns thick, each of the two connections at the boundary 119 is 0.06 mm wide. Other methods of applying vibrations known to those skilled in the art can also be used. The method of the present invention avoids burrs and distortions associated with cutting using a mold. In addition, the mold's cutting performance degrades depending on adjustments or changes over time.

According to the second embodiment of the present invention, as previously described, the tab structure 120 is arbitrarily connected to and removed from the flexure 42. Referring again to FIGS. 10a and 10b, to remove the tab structure 120 from the flexure 42, the elasticity of the tab structure 120 is used to open both ends of the tab with the female portion 122 in the direction shown by arrows 126 when attaching. Therefore, the second embodiment avoids a cutting or a breaking step to remove the tab structure 120.

Although the embodiments of the present invention attach the tab structure to the flexure, in an alternative embodiment, the tab structure is attached to the load beam. Furthermore, in other embodiments, the tab structure can be attached to other parts of the suspension assembly without deviating from the scope of the present invention.

The present invention enables a head suspension assembly to be assembled precisely and easily.

The foregoing description of the preferred embodiment of the invention has been presented for the purposes of illustration and description. It is not intended to be exhaustive or to limit the invention to the precise form disclosed. Many modifications are possible in light of the above teaching. It is intended that the scope of the invention be limited not with this detailed description but rather by the claims appended hereto.

we claim:

1. A suspension assembly for supporting a data transducer in a hard disk drive comprising:

a load beam for mechanically supporting a data transducer;

a flexure connected at a first end to said load beam and having less stiffness than said load beam, said flexure comprising a pair of boundary regions extending outward, one from each side of said flexure proximate the flexures' connection to said load beam and a transducer support region on a second end of said flexure to which a data transducer can be mechanically attached;

a tab structure substantially enclosing the periphery of the transducer support region of said flexure and attached to said flexure at each of said boundary regions by a pair of v-shaped notches; and at least one conductive wire extending over said load beam, flexure and tab structure.

2. The suspension assembly as claimed in claim 1, wherein said tab structure is further comprised of a first leg extending along a first edge of said flexure parallel to said transducer support region, and a second leg extending along a second edge of said flexure parallel to said transducer support region, and a wire bonding region connecting each of said legs, wherein said conductive wire is secured at a predetermined interval along said wire bonding region to facilitate the attachment of said conductive wire to said data transducer.

3. The suspension system as claimed in claim 2, wherein said tab structure is integrally formed with said flexure and said first and second leg terminate at said notched portion connected to said flexure boundary regions.

4. The suspension assembly as claimed in claim 3, wherein said tab structure is removed from said flexure by cutting.

5. The suspension assembly as claim 2, wherein said tab structure is removed from said flexure by vibrating said boundary region.

6. The suspension assembly as claimed in claim 2, wherein said tab structure further includes a pair of positioning holes on said wire bonding region for positioning said data transducer on said transducer support region and within said tab structure in order to enable said wire to be bonded to said data transducer.

7. The suspension assembly as claimed in claim 2, wherein the tab structure further includes notches on said wire bonding region for the alignment of said wires at predetermined intervals.

8. The suspension assembly as claimed in claim 2, wherein said wires are secured to said tab structure by an adhesive.

9. A method for assembling a head gimbal assembly for a hard disk drive comprising the steps of:

attaching to a load beam a flexure assembly having a pair of boundary regions, one extending from each side of the flexure, a tab structure substantially enclosing a transducer support region on one end of the flexure, a tab structure substantially enclosing the periphery of the transducer support region of the flexure and attached to the flexure at the boundary regions by a pair of v-shaped notches;

fixing a plurality of signal wires to said tab in a wire-bonding region on said tab located beyond the end of said transducer support region and held in a plane substantially flush with said flexure with a specified interval set among said wires;

positioning a data transducer between said end of said flexure and said tab to which said wires are fixed; and bonding said wires to said transducer.

10. The method as claimed in claim 9, further comprising the step of removing said tab structure from said flexure.

11. The method as claimed in claim 10, wherein the step of removing includes cutting said tab structure from said suspension.

12. The method as claimed in claim 9, wherein the tab structure has a plurality of notches on the wire-bonding region and the step of fixing further includes setting the wires in said notches.

13. The method as claimed in claim 9, wherein said step of fixing includes securing said wires to said tab structure by use of an adhesive.

* * * * *